Sept. 22, 1964  W. J. CARUSO ETAL  3,149,502
AUTOMATIC BALANCING APPARATUS
Filed Dec. 6, 1961  2 Sheets-Sheet 1
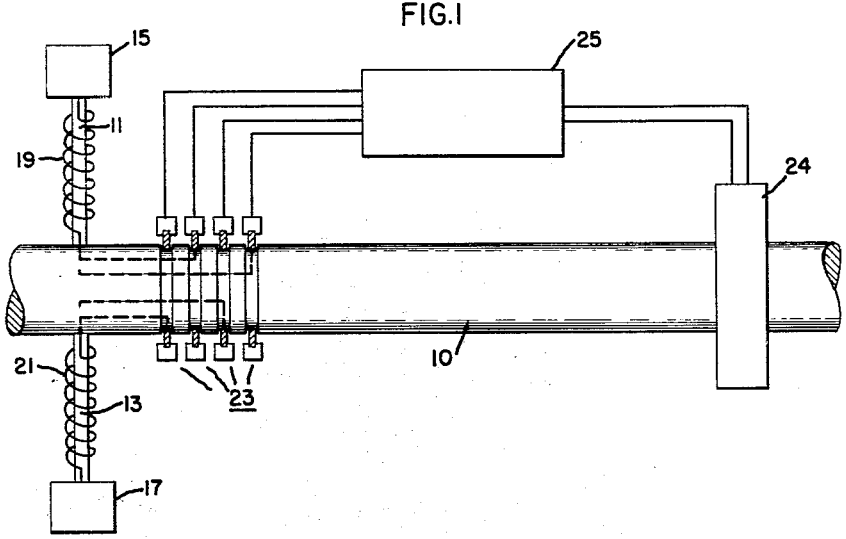
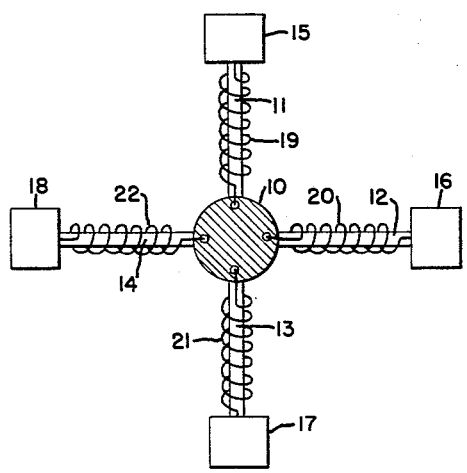
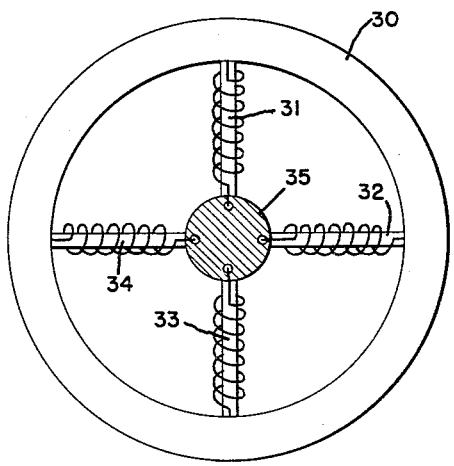
INVENTORS:
WILLIAM J. CARUSO,
HERBERT N. HOFFMAN,
STANFORD NEAL,
BY W. C. Crutcher
THEIR ATTORNEY.

Sept. 22, 1964  W. J. CARUSO ETAL  3,149,502
AUTOMATIC BALANCING APPARATUS
Filed Dec. 6, 1961  2 Sheets-Sheet 2

INVENTORS:
WILLIAM J. CARUSO,
HERBERT N. HOFFMAN,
STANFORD NEAL,

BY  W. C. Crutcher
THEIR ATTORNEY.

3,149,502
AUTOMATIC BALANCING APPARATUS
William J. Caruso, Fitchburg, and Herbert N. Hoffman, Lunenburg, Mass., and Stanford Neal, Schenectady, N.Y., assignors to General Electric Company, a corporation of New York
Filed Dec. 6, 1961, Ser. No. 157,337
6 Claims. (Cl. 74—573)

This invention relates to apparatus for continuously balancing a rotor while the rotor is rotating and, more specifically relates to electrically responsive balancing apparatus positioned on the rotor.

Most machinery rotor balance is dependent to a certain degree upon environmental conditions and for this reason the balance and, therefore, associated rotor vibration, can be expected to change as conditions change. Consequently, it is desirable that machines requiring low levels of vibration be provided with a means of making slight balance refinement without interrupting or stopping a machine. There are a multitude of prior art balancing devices, most of which require that the machinery be shut off while balancing. The few prior art balancing devices which reduce rotor vibration while the machinery is operating require that balancing material be added to the rotor while the rotor is in operation, such as, by adding liquid to cavities in the rotating member.

It is a primary object of the invention to provide an improved apparatus for continuously balancing a rotating rotor.

Another object of the invention is to provide electrically responsive balancing means positioned on a rotor to continuously tend to counterbalance any dynamic unbalancing forces in the rotor during rotation.

It is a further object of the invention to provide electrical heating apparatus for continuously counterbalancing any dynamic unbalancing forces in a rotor during rotation.

Another object of the invention is to provide a rotor with balancing members which may be continually adjusted while the rotor rotates so as to continuously tend to counterbalance any dynamic unbalancing forces in the rotor during rotation.

Briefly stated, the invention relates to apparatus for continuously balancing a rotor while the rotor is rotating. Means are provided to produce a signal indicative of the dynamic unbalance of the rotor while rotating. Electrically responsive balancing means are positioned on the rotor to vary the dynamic characteristics of the rotor. Means are connected to the signal producing means to energize the electrically responsive balancing means in accordance with signals received from the signal producing means in a manner to thereby vary the dynamic characteristics of the rotor to continuously tend to counterbalance any dynamic unbalancing forces in the rotor during rotation.

The invention includes several modifications of electrically responsive balancing means which may be position on the rotor to be balanced. Two modifications are described wherein portions of the rotor are electrically heated to change the dynamic characteristics of the rotor; and when such heating is selectively performed, the dynamic characteristics of the rotor may be changed to continuously tend to counterbalance any dynamic unbalancing forces in the rotor during rotation. Another electrically responsive balancing modification of the invention may comprise a pair of balancing members positioned on the rotor to be balanced. The balancing members can be dynamically unbalanced by relative movement between the members; and by changing the angular relationship between the two balancing members, the dynamic characteristics of the rotor to be balanced may be varied to continuously counterbalance any dynamic unbalancing forces in the rotor during rotation.

Further features, objects and advantages of this invention will become apparent with reference to the following specification and drawings in which:

FIG. 1 is a schematic view of one embodiment of the balancing apparatus of the invention;

FIG. 2 is an end view of a portion of the balancing apparatus of FIG. 1;

FIG. 3 shows a modified form of the apparatus of FIG. 1;

Figure 4:
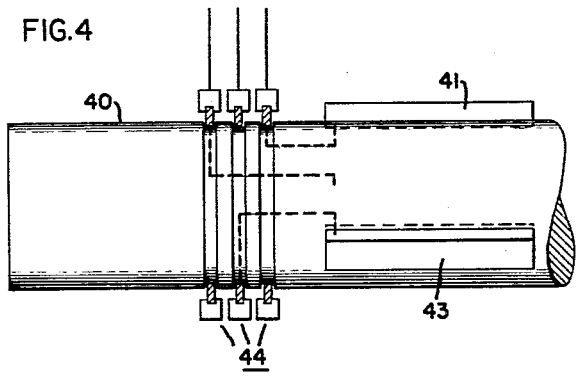
FIG. 4 is a schematic view of another embodiment of the balancing apparatus of the invention.

Referring to the drawings, FIG. 1 shows a preferred embodiment of the invention wherein a shaft 10 represents the rotor of any rotating machinery requiring balance refinement during operation. For example, it might represent the shaft of a turbine rotor requiring a low level of vibration.

In accordance with one modification of the invention, FIG. 2 shows an electrically responsive balancing means comprising a plurality of radially extending struts 11, 12, 13 and 14 positioned on the rotor shaft 10. Each of the struts has one of a plurality of weights 15, 16, 17 and 18 respectively positioned on its outer end. A plurality of electric heating elements or coils 19, 20, 21 and 22 are provided each being respectively wound around one of the struts 11–14.

Applying current to the electrical heating coils 19–22 will cause the struts associated with the coils to be heated thus expanding them and increasing their length. It will be appreciated that applying unequal amounts of current to the coils 19–22 will result in unequal amounts of radial expansion of the struts 11–14, which, of course, will vary the dynamic characteristics of the rotor shaft 10. The weights 15–18 are provided to give the system a more precise control, that is, a slight increase of the length of one of the struts carrying a weight will make a considerable change in the dynamic characteristics in the rotor shaft 10, depending, of course, on the relative size of the weights and struts with respect to the rotor being balanced.

The remainder of the apparatus disclosed in FIG. 1 is designed to selectively provide a current to the coils 19–22 in response to signals corresponding to the dynamic unbalance of the rotor shaft 10. A plurality of slip ring and brush arrangements, as generally indicated at 23, are provided in conjunction with shaft 10 to selectively introduce the currents to the coils 19–22. Each of the coils 19–22 is, of course, connected to a respective one of the slip ring and brush arrangements 23 as shown by the dotted lines.

In order that the proper counterbalancing forces are introduced to the rotor shaft 10, it is necessary that the coils 19–22 be energized in accordance with signals indicative of the dynamic unbalance of the rotor shaft 10 while rotating. Such signal producing means may take the form of well-known mechanical or electrical vibration detecting devices shown schematically at 24 in FIG. 1. Since the signal producing means 24 does not constitute a part of the present invention and any suitable arrangement known in the prior art may be utilized, a structural description of such means will not be given herein. An example of a vibration detector and signal producing device which may be employed is described in U.S. Patent 2,534,268 to L. M. Kahn et al. The unbalance signal received from the device 3 is fed to a control box 25 which, in conjunction with the slip ring and brush arrangement 23 selectively energizes one or more of the coils 19–22 to continuously counterbalance any dynamic unbalancing forces in the rotor shaft 10 during rotation.

The structural details of the control device 25 will not be given, since such controls are known in the prior art and do not form a part of the present invention. A suitable control which may be adapted to the present invention is described in the above-mentioned Kahn et al. patent. Functionally, the control box 25, in response to the signals from the signal producing means 24, determines which one or ones of the coils 19–22 should be energized and for how long. This control might for instance be an electronic trial-and-error type device which would consecutively heat the respective coils to determine which causes optimum decrease in the vibration level.

Although the automatic feature provided by the control box 25 is preferable, it will be apparent that the balancing apparatus could be operated manually. When the vibration detecting and signal producing device 24 indicates that an unbalanced condition exists, an operator could by trial-and-error selectively energize the various coils 19–22 to determine which strut should be heated to produce the lowest vibration level.

It should be appreciated that although four struts 11–14 are shown in FIGS. 1 and 2, any additional number of struts desired may be utilized, adding, of course, the necessary heating coils and slip rings. Also, the weights 15–18 are merely shown as an example of the invention, and they could take any shape desired or could be an integral portion of the structure of the rotor to be balanced. One alternative, for example, may be seen in FIG. 3 where the weights 15–18 have been replaced by a somewhat flexible ring member 30 secured to the ends of struts 31–34. Expansion and contraction of the appropriate struts causes distortion of the flexible ring 30 to produce a compensating balancing effect.

Figure 5:
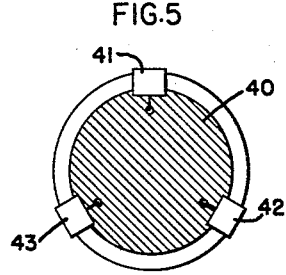
FIG. 5 is an end view of the structure in FIG. 4.

Another arrangement for balancing rotating rotors in accordance with the invention is shown in FIG. 4 and, like the embodiment of FIG. 1, utilizes the principle of heating a portion of the rotor to change its dynamic balance characteristics. A rotor shaft 40 to be balanced is provided with three electric heating elements 41, 42 and 43 longitudinally disposed and circumferentially spaced around the periphery of the shaft, as best seen in FIG. 5. The heating elements 41–43 may be partially embedded in the shaft. The remainder of the balancing apparatus needed for the embodiment shown in FIG. 4 is similar to that shown in FIG. 1.

Slip ring and brush arrangements indicated at 44 conduct current to the heaters 41–43. The vibration detecting and signal producing means, similar to device 24 shown by FIG. 1, and the means to selectively energize the heating elements 41–42, similar to control box 25, are not shown in FIG. 4; but it will be understood that such components are needed to complete the system. Selectively energizing one or more of the heating elements 41–43 causes the shaft 40 to be heated unevenly so as to be bent or bowed due to expansion caused by heat. Consequently, the dynamic characteristics of the rotor shaft 40 are varied. As explained in the description of the coils in FIG. 1, the heaters 41–43 may be selectively energized in response to signals from the signal producing means to thereby vary the dynamic characteristics of the rotor shaft 40 to continuously counterbalance any dynamic unbalancing forces in the rotor shaft during rotation. It should be understood, of course, that any number of heater elements may be utilized and that they may be spaced and positioned as desired.

Figure 6:
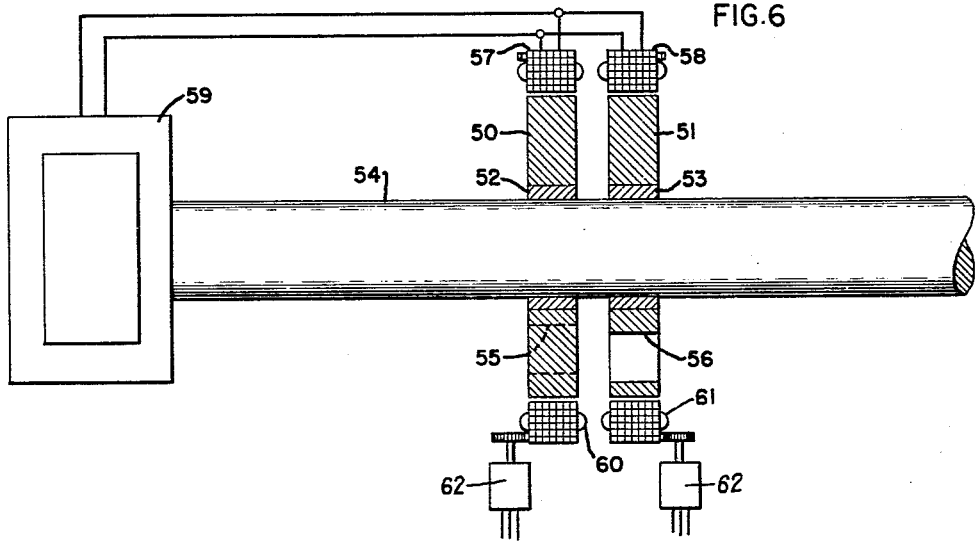
FIG. 6 is a schematic view of a third embodiment of the invention incorporating a pair of electrically responsive balancing members.

Another embodiment of the invention shown in FIG. 6 employs a somewhat different principle than the heating arrangements of FIGS. 1 and 4. However, the arrangement of FIG. 6 is similar to the others in that it utilizes an electrically response balancing means positioned on the rotor to be balanced.

More specifically, a pair of balancing members or rotors 50 and 51 are rotatably mounted on bearings 52 and 53, which, in turn, are positioned on shaft 54, which represents the shaft of the rotor to be balanced. Each of the rotors 50 and 51 are dynamically unbalanced, which may be accomplished by providing holes 55 and 56 in the rotors 50 and 51 respectively, or by any other suitable means such as eccentrically located weights. Means are provided for rotating the balancing rotors 50 and 51 at exactly the same speed as the shaft 54.

The balancing rotors 50 and 51 may for instance be constructed like synchronous motor rotors, rotated by means of field producing devices 57 and 58 respectively, which are comparable to the stator coils of an electric motor. The field producing stators 57 and 58 may be provided with current from any suitable source which will induce rotation of the rotors 50 and 51 at exactly the same speed as the shaft 54. A convenient way to provide the necessary power is to employ A.-C. generator 59 which is driven by the shaft 54 to provide the proper frequency current. In order to vary the dynamic characteristics of the rotor system, it is necessary to change the angular relationship between the two unbalanced rotors 50 and 51 during their rotation with shaft 54. In other words, changing the rotational position of hole 55 in rotor 50 with respect to the position of hole 56 in rotor 51 will change the dynamic balance characteristics of the rotor system 54, 50, 51.

One means to accomplish this change in angular relationship between rotors 50, 51 is to mount one or both of the stator sections 57 and 58 on bearings 60 and 61 respectively so that the stators may be independently positioned rotationally. Thus, shifting stator section 57 circumferentially while it is inducing rotation in rotor 50, will cause the rotor 50 to momentarily accelerate or decelerate, with the result that the relative angular position of rotor 50 is changed with respect to rotor 51. This shifting of the stators may be accomplished by servo motors 62 operating through a gear attached to the stators 57, 58.

This arrangement permits changing the balance of the rotor shaft 54 from "zero compensation," when the rotors are positioned to counteract each other (with the holes 55, 56 spaced 180° apart), to "maximum compensation," when the stators 57 and 58 are positioned so that the rotor unbalances are added to each other (with the holes 55, 56 adjacent each other). Thus shifting the stators relative to each other determines the magnitude of the compensating balancing force provided, while shifting both stators simultaneously adjusts the phase relation between the compensating force and the rotor 54.

It will thus be realized that unbalancing forces in rotor shaft 54 may be continuously counterbalanced by selectively changing the relative angular relationship between the balancing rotors 50 and 51 and between the rotors 50, 51 and shaft 54. As in the embodiments of FIGS. 1 and 4, a signal producing means (not shown in FIG. 6) produces a signal indicative of the dynamic unbalance of the rotor shaft 54. These signals may be utilized to indicate the proper positions for stator members 57 and 58, and to operate servo motors 62. Also, the means for determining which stator, 57 or 58, should be rotated and how much either should be rotated is not shown in that this may be accomplished manually or by some suitable automatic mechanism similar to control box 25 in FIG. 1, which would control the means to rotate the stators in response to signals from the signal producing means. Thus, it can be seen that with the apparatus described, the dynamic characteristics of the rotor system may be changed by continuously changing the amount and phase relation of the counterbalancing force required to balance any dynamic unbalancing force on the rotor shaft 54 during rotation.

The motor type balancing arrangement of FIG. 6 has been shown and described by way of example as having a pair of balancing members or rotors. However, it will be appreciated that additional balancing rotors spaced axially along the rotor 54 may be utilized to provide greater flexibility in obtaining suitable compensating forces for any type of dynamic unbalance which might be encountered.

It will be appreciated that the above are various examples of the embodiments of the invention, and it will be obvious that many changes and modifications may be made without departing from the invention in its broader aspects. It is of course intended in the appended claims to cover all such changes and modifications as fall within the true spirit and scope of the invention.

What we claim as new and desire to secure by Letters Patent of the United States is:

1. In apparatus for continuously balancing a rotor member having means to produce a signal indicative of the dynamic unbalance of the rotor member while rotating, the combination of a plurality of electrical heating elements circumferentially spaced on said rotor members to expand portions thereof so as to vary the dynamic balance characteristics of the member, and means to selectively energize said heating elements in accordance with signals received from said signal producing means to vary the dynamic characteristics of said rotor member to continuously counterbalance any dynamic unbalancing forces in the member during rotation.

2. In apparatus for continuously balancing a rotor in operation having means to produce a signal indicative of the dynamic unbalance of the rotor, the combination of a plurality of radially extending struts with balancing weights on the outer ends thereof attached to said rotor, a plurality of electric heating elements each associated with one of said struts to heat the strut, and means to selectively energize said heating elements in accordance with signals received from said signal producing means to vary the dynamic balance characteristics of the rotor to thereby continuously counterbalance any dynamic unbalancing forces in the rotor during operation.

3. In apparatus for continuously balancing a rotor while rotating having means to produce a signal indicative of the dynamic unbalance of the rotor while rotating, the combination of a plurality of radially extending struts attached to said rotor, a balancing ring attached to the outer ends of said struts, a plurality of electric heating elements each associated with a respective one of said struts to heat the strut, and means to selectively energize said heating elements in accordance with signals received from said signal producing means to vary the dynamic balance characteristics of the rotor to thereby continuously tend to counterbalance any dynamic unbalancing forces in the rotor during operation.

4. In apparatus for continuously balancing a rotor while rotating having means to produce a signal indicative of the dynamic unbalance of the rotor, the combinations of a plurality of radially extending struts attached to said rotor and having weights on the outer ends thereof, a plurality of electric heating elements each associated with one of said struts to heat the strut, a plurality of slip ring and brush sets connected to said respective heating elements, and means to selectively energize said sets in accordance with signals received from said signal producing means to heat one or more of said struts to vary the dynamic characteristics of the rotor to thereby continuously tend to counterbalance any dynamic unbalancing forces in said rotor during rotation.

5. In apparatus for continuously balancing a rotating rotor having means to produce a signal indicative of the dynamic unbalance of the rotor while rotating, the combination of a plurality of electrical heating elements angularly positioned and extending longitudinally on the periphery of said rotor to vary the dynamic characteristics of said rotor, and means to selectively energize said heating elements in accordance with signals received from said signal producing means to thereby vary the dynamic balance characteristics of said rotor to continuously counterbalance any unbalancing forces occurring on said rotor during rotation.

6. In apparatus for continuously balancing a rotor during operation having means to produce a signal indicative of the dynamic unbalance of the rotor, the combination of a plurality of longitudinally extending electrical heating elements angularly spaced on the periphery of said rotor to vary the dynamic characteristics of the rotor, a plurality of slip ring and brush arrangements each connected to a respective one of said heating elements, and means to selectively energize said elements in accordance with signals received from said signal producing means to thereby vary the dynamic balance characteristics of the rotor to continuously counterbalance any unbalancing forces on the rotor during operation.

References Cited in the file of this patent
UNITED STATES PATENTS

| | | |
|---|---|---|
| 2,322,561 | Bevins et al. | June 22, 1943 |
| 2,384,838 | Kellogg | Sept. 18, 1945 |
| 2,789,436 | White | Apr. 23, 1957 |
| 2,915,918 | Comstock et al. | Dec. 8, 1959 |